(12) United States Patent
Dones et al.

(10) Patent No.: US 6,540,942 B2
(45) Date of Patent: Apr. 1, 2003

(54) NONAQUEOUS COMPOSITIONS AND ADDITIVES THEREFOR

(75) Inventors: Miguel A. Dones, Hatfield, PA (US); Ramesh L. Narayan, Harleysville, PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/977,824

(22) Filed: Oct. 15, 2001

(65) Prior Publication Data

US 2002/0123537 A1 Sep. 5, 2002

Related U.S. Application Data

(60) Provisional application No. 60/247,428, filed on Nov. 9, 2000.

(51) Int. Cl.[7] .............................. C08F 2/46; C09K 3/00
(52) U.S. Cl. .............................. 252/363.5; 252/182.11; 252/182.12; 252/182.29; 522/100; 522/170; 522/71; 522/75; 522/79; 522/80; 522/83; 528/403; 524/366; 524/376; 524/377; 568/618; 568/619; 568/622; 568/623; 568/624; 516/198
(58) Field of Search .................. 252/363.5; 522/100, 522/170, 83, 71, 75, 79, 80; 528/403; 524/366, 377, 376; 568/618, 619, 622, 623, 624; 516/198

(56) References Cited

U.S. PATENT DOCUMENTS

| 4,086,279 | A | * | 4/1978 | Langdon et al. | ............. | 568/623 |
| 4,322,505 | A | * | 3/1982 | Jacobs | ........................... | 525/44 |
| 4,574,061 | A | * | 3/1986 | Ries | ............................. | 562/77 |
| 4,600,742 | A | * | 7/1986 | Higgins | ....................... | 524/166 |
| 4,837,283 | A | * | 6/1989 | Ries | ............................. | 525/403 |
| 5,827,453 | A | | 10/1998 | Gross et al. | | |
| 5,877,245 | A | | 3/1999 | Wiggins et al. | | |
| 6,110,977 | A | | 8/2000 | Gross et al. | | |
| 6,350,787 | B1 | | 2/2002 | Wiggins et al. | | |
| 6,387,962 | B1 | | 5/2002 | Wiggins et al. | | |

* cited by examiner

*Primary Examiner*—James J. Seidleck
*Assistant Examiner*—Sanza L. McClendon
(74) *Attorney, Agent, or Firm*—John E. Drach; Henry E. Millson, Jr.

(57) ABSTRACT

Nonaqueous compositions comprising at least one product of the reaction between

A) a linking agent of formula I

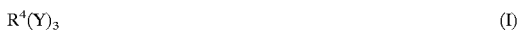

$$R^4(Y)_3 \qquad (I)$$

Wherein each Y group is a halogen atom or one Y group is a halogen atom and two Y groups represent an epoxy oxygen atom, which is attached to two adjacent carbon atoms in the $R^4$ group to form an epoxy group, and $R^4$ is an alkanetriyl group containing from 3 to 10 carbon atoms; and B) a compound of formula II

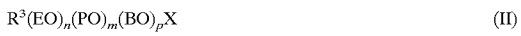

$$R^3(EO)_n(PO)_m(BO)_pX \qquad (II)$$

Wherein $R^3$ is substituted or unsubstituted, saturated or unsaturated, organic oxy or thio group having from 1 to 36 carbon atoms or a primary or secondary amino group having from 1 to 36 carbon atoms; n is a number of from 0 to 50; m is a number of from 0 to 50; p is a number of from 0 to 50; and X is hydrogen, or X can be a mercapto group, an amino group, or a $C_1$–$C_6$ alkylamino group in place of a terminal —OH group, provided that when X is mercapto, amino or a $C_1$–$C_6$ alkylamino, the sum of n, m, and p must be at least 1; and the mole ratio of I:II is from about 0.1:1 to about 5:1.

38 Claims, No Drawings

US 6,540,942 B2

NONAQUEOUS COMPOSITIONS AND ADDITIVES THEREFOR

CROSS REFERENCE TO RELATED APPLICATIONS

This application claims the benefit of copending provisional application ser. No. 60/247,428, filed on Nov. 9, 2000, the entire contents of which are incorporated herein by reference.

FIELD OF THE INVENTION

This invention relates to additives for nonaqueous compositions, and to the nonaqueous compositions containing such additives.

BACKGROUND OF THE INVENTION

Nonaqueous compositions, especially those that produce hard coatings, typically contain additives such as defoaming agents, flow modifiers, slip additives, wetting agents, and dispersing agents. However, additives that are effective in aqueous systems are not always effective in nonaqueous systems. Effective additives, such as defoaming agents for nonaqueous systems are commercially important and are in great demand.

SUMMARY OF THE INVENTION

The present invention relates to nonaqueous compositions containing at least one additive which is the product of the reaction between a linking agent of formula I below:

Wherein each Y group is a halogen atom or one Y group is a halogen atom and two Y groups represent an epoxy oxygen atom, which is attached to two adjacent carbon atoms in the $R^4$ group to form an epoxy group, and $R^4$ is an alkanetriyl group containing from 3 to 10 carbon atoms, the preferred linking agent being epichlorohydrin; and a compound having the formula (II)

Wherein $R^3$ is a substituted or unsubstituted, saturated or unsaturated, organic oxy or thio group having from 1 to 36 carbon atoms or a primary or secondary amino group having from 1 to 36 carbon atoms; n is a number of from 0 to 50, e.g., from 1 to 50; m is a number of from 0 to 50 e.g., from 1 to 50; p is a number of from 0 to 50 e.g., from 1 to 50; and X is hydrogen, or X can be a mercapto group or an amino group (i.e., an amino or a $C_1$–$C_6$ alkylamino group) in place of a terminal —OH group, provided that when X is mercapto, amino or $C_1$–$C_6$ alkylamino, the sum of n, m, and p must be at least 1.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In the product of the reaction between the linking agent of formula I and the compound of formula II, the mole ratio of I:II is from 0.1:1 to 5:1, preferably from 0.4:1 to 2:1, and more preferably from 0.6:1 to 1.4:1.

The linking agent of formula I is preferably epichlorohydrin although other epihalohydrins can be used. Also, trihaloalkanes can be used, such as 1,2,3-trichloropropane, 1,2,4-trichlorobutane, 1,3,6-trichlorohexane and the like. Instead of chlorine in the epihalohydrins and the trihaloalkanes, the corresponding bromine and iodine compounds can also be used, including compounds containing two or even three of the above halogens.

In the compounds of formula II, it is understood that EO stands for the residue of ethylene oxide and PO stands for the residue of propylene oxide and BO stands for the residue of butylene oxide.

When the X group of formula (II) is a mercapto group, the $R^3$ group will preferably have from about 4 to about 36 carbon atoms, examples of such compounds of formula II include but are not limited to, alkoxylated dodecyl mercaptan and alkoxylated 1-hexadecanethiol.

The compounds of formula (II) can be alkoxylated or non-alkoxylated primary or secondary amines. When the compounds of formula II are amines, n is a number from 0 to 50, preferably from 1 to 50, m is a number from 0 to 50 and p is a number from 0 to 50, preferably from 1 to 50. Examples of the secondary amines useful for the purposes of the invention include but are not limited to, alkoxylated dibutyl amine, alkoxylated dicyclohexyl amine, alkoxylated diethylethanolamine, and alkoxylated dioctylamine.

When X in formula II is an amine or sulfhydryl group, the resulting compounds can be readily prepared from the corresponding alcohols wherein the terminal hydroxy group is replaced by an —SH group or by an amine nitrogen. For example, a compound of formula II where X is —OH can be subjected to a catalyzed ammoniation (with ammonia, or a lower alkylamine) for replacement of the hydroxyl, or to a capping of the hydroxyl with epichlorohydrin followed by ammoniation (with ammonia, or a lower alkylamine) of the resulting glycidyl group. Where X is —SH, the corresponding alcohol can be converted to the mercaptan by methods well known to the art, e.g., by converting the alcohol to a halide and reacting the halide with sodium hydrosulfide.

The substituents that can be present on the substituted $R^3$ groups can be single or multiple substitutions such as a halogen substitution, for example Cl, Fl, I and Br: a sulfur functionality such as a mercaptan or thio group; a nitrogen functionality such as an amine or amide functionality; an alcohol functionality, a silicon functionality such as a siloxane; an ether functionality, e.g., a $C_1$–$C_6$ alkoxy group; or any combination thereof.

In general, compounds of formula 11 wherein the sum of n, m, and p is at least 1, especially at least 2, are preferred.

When $R^3$ is a primary or secondary amino group, the group preferably contains from 4 to 22 carbon atoms.

Also, when X is hydrogen p is preferably a number of from 1 to 50. When $R^3$ is a primary or secondary amino group, p is also preferably a number of from 1 to 50.

The nonoxy, nonthio, and nonamino components of the $R^3$ group can be any substituted or unsubstituted, saturated or unsaturated organic moiety having from 1 to 36 carbon atoms. Thus, the nonthio, nonoxy, and nonamino components of the $R^3$ aliphatic group can be linear or branched alkyl groups, linear or branched alkenyl or alkynyl groups, saturated carbocyclic moieties, unsaturated carbocyclic moieties having one or more multiple bonds, saturated heterocyclic moieties, unsaturated heterocyclic moieties having one or more multiple bonds, substituted linear or branched alkyl groups, substituted linear or branched alkenyl or alkynyl groups, substituted saturated carbocyclic moieties, substituted unsaturated carbocyclic moieties having one or more multiple bonds, substituted saturated heterocyclic moieties, and substituted unsaturated heterocyclic moieties having one or more multiple bonds. Examples of the above include but are not limited to an alkyl group having from 4 to 22 carbon atoms, an alkenyl group having from 4 to 22 carbon atoms, and an alkynyl group having from 4 to 22 carbon atoms. $R^3$ can also be an aryl or arenyl group. The aryl groups can be phenyl, naphthyl, anthryl, etc., which can be alkyl substituted. Arenyl groups are alkyl-substituted aromatic radicals having a free valence at an alkyl carbon atom such as a benzylic group. Alkyl groups having from 4 to 12 carbon atoms are preferred, and alkyl groups having from 8 to 10 carbon atoms are most preferred. The degree of ethoxylation is preferably from 2 to about 50 with the most preferred being from about 4 to about 50 while the degree of propoxylation and butoxylation can vary from 0 to about 50, preferably from 1 to about 10. The degree of propoxylation and or butoxylation will be determined by the desired degree of solubility or miscibility in the nonaqueous compositions of the invention. The solubility or miscibility will ultimately be determined by such factors as the number of carbon atoms in $R^3$ and the relative amounts EO, PO and BO.

Optionally, an additional component can be reacted with the linking agent of formula (I) and the compound of formula (II). A glycidyl ether or amine can be added to the reaction of formula (I) and formula (II). The amount of the glycidyl ether or glycidyl amine is from about 1 to about 20 mole percent based on the moles of formula (II) used in the reaction. When the glycidyl ether or glycidyl amine is added to the monofunctional starting material of formula II the ratio of formula I to formula II plus the glycidyl ether or glycidyl amine is preferably from about 0.8 to about 1.4. Examples of the glycidyl ethers include, but are not limited to, PEG 600 diglycidyl ether, TETRONIC™ 701 tetraglycidyl ether, triglycidyl di or triethanolamine, polyoxyethylene (POE) 200 tallow amine diglycidyl ether, propoxylated (POP10) trimethylol propane triglycidyl ether, propoxylated (POP7) pentaerythritol tetraglycidyl ether. Examples of glycidyl amines include, but are not limited to, tetraglycidyl 1,6-hexane diamine, tetraglycidyl JEFFAMINE™ EDR-148, and tetraglycidyl isophorone diamine.

The above reaction products can be obtained by the process disclosed in U.S. Pat. No. 5,827,453, which is expressly incorporated herein by reference.

These reaction products exhibit defoaming activity in nonaqueous compositions and are accordingly useful as defoaming agents therein.

In nonaqueous compositions that produce hard coatings when cured, the present reaction products also act as flow modifiers, slip additives, wetting agents for wetting pigments contained therein, and as dispersing agents for the pigments.

Hence, the preferred nonaqueous compositions of the invention are those that produce hard coatings when cured, such as nonaqueous compositions that are cured by ultraviolet radiation or by electron beam irradiation. Other nonaqueous compositions that produce hard coatings when cured include epoxy resin compositions, which are thermosetting resins based on the reactivity of the epoxide group. Such compositions include those made from epichlorohydrin and bisphenol A or an aliphatic polyol, e.g. glycerol; polyolefins oxidized with peracetic acid and cured with anhydrides; and epoxy novolak resins made by the reaction of epichlorohydrin with a novolak resin.

Nonaqueous compositions that are used for purposes other than the production of hard coatings for which the reaction products of the invention can be used as defoaming agents include sealants, adhesives, pigment slurries, inks, diesel fuel, solvent based acrylics, alkyds, amino resin based epoxies, polyesters, urethanes, silicones, powder coatings and tinting pastes.

The nonaqueous compositions that can be cured by ultraviolet (UV) radiation or by electron beam (EB) irradiation contain at least one monomer or oligomer that polymerizes when exposed to ultraviolet or electron beam irradiation. Preferred UV/EB curable monomers and oligomers for use herein are products marketed by Cognis Corporation of Ambler, Pa. under the trademark PHOTOMER®.

UV/EB curable monomers and oligomers include compounds such as acrylates and phenones. Examples of acrylate photomers include the triacrylate of trimethylolpropane•3EO, modified aromatic epoxy acrylate oligomer, 1,6-hexanediol diacrylate, and trifunctional aliphatic epoxy acrylate oligomer. Examples of phenones include a liquid eutectic mixture of benzophenone and 4-methyl benzophenone, and 2,2-dimethoxy-2-phenyl acetophenone.

The defoamer-effective quantities of the defoamer of the invention in the nonaqueous compositions of the invention, including the UV/EB curable monomer or oligomer-containing coating compositions of the invention, can be readily determined for any particular composition, and are generally in the range of from 0.1 to 2% by weight, more usually in the range of from 0.2 to 0.5% by weight, based on the weight of the composition.

The nonaqueous UV/EB curable monomer or oligomer-containing coating compositions can also contain other components, such as waxes; amines, e.g., triethanolamine; pigments or dyes; and the like.

These coating compositions can be formulated by adding all of the ingredients together and mixing them at a temperature of from 40 to 80° C., preferably at 50 to 65° C., until all the ingredients are dissolved or homogenized and a clear solution or dispersion is obtained. Of course, if the composition contains dyes or pigments, it will be colored instead of clear.

The coating compositions of the invention containing the defoamer of the invention are applied by spreading them evenly on a substrate, usually a hard substrate, and then curing the compositions by the application of ultraviolet radiation or electron beam irradiation, which can be carried out by procedures well known to the art.

The coating compositions of the invention when formulated have very low levels of air entrapment, and when cured have almost no surface defects such as orange-peel or fish eyes. In addition, not only do the defoamers of the invention provide excellent defoaming action during formulation, but they also act as flow and leveling agents, with very low levels of trapped air and high gloss when the coating is applied to a substrate and cured with UV radiation or electron beam irradiation, as well as acting as slip additives and wetting and dispersing agents for pigments contained therein.

As discussed above, the coatings can be clear or colored with dyes or pigments.

The invention will be illustrated but not limited by the following examples.

EXAMPLES

Example 1

The reaction product of isodecyl alcohol•4EO and epichlorohydrin in a ratio of epichlorohydrin: alcohol of 1.1:1 was prepared according to the procedure set forth in Example 1 of U.S. Pat. No. 5,827,453.

The resulting reaction product was mixed with 1,6-hexanediol diacrylate in a 1:1 weight/weight mixture, and was used as a defoamer in Formulation A in Table 1 below. Formulation B was formulated without the defoamer.

The formulations were prepared by adding all of the ingredients to a beaker, and mixing the ingredients together using a mechanical stirrer at a temperature of about 60° C. until the mixture of ingredients formed a clear solution.

The solutions were then coated onto a flat metal substrate and cured with ultraviolet radiation until hard coatings were obtained.

TABLE I

| Material | Formulation A | Formulation B |
| --- | --- | --- |
| PHOTOMER ® 4149[1] | 18.00 | 18.00 |
| PHOTOMER ® 3038[2] | 19.00 | 19.00 |
| PHOTOMER ® 4017[3] | 42.45 | 42.85 |
| RCC 13-215[4] | 8.00 | 8.00 |
| PHOTOMER ® 81[5] | 7.00 | 7.00 |
| PHOTOMER ® 51[6] | 1.00 | 1.00 |
| Pinnacle 2500 wax[7] | 0.15 | 0.15 |
| Defoamer | 0.40 | 0.00 |
| Triethanolamine[8] | 4.00 | 4.00 |
| Total | 100.00 | 100.00 |

[1]PHOTOMER ® 4149: triacrylate of three mole ethoxylated trimethylolpropane
[2]PHOTOMER ® 3038: modified aromatic epoxy acrylate oligomer
[3]PHOTOMER ® 4017: 1,6-hexandiol diacrylate
[4]RCC 13-215: Trifunctional aliphatic epoxy acrylate oligomer
[5]PHOTOMER ® 81: Liquid eutectic mixture of benzophenone and 4-methyl benzophenone
[6]PHOTOMER ® 51: 2,2-dimethoxy-2-phenyl acetophenone
[7]Pinnacle 2500 wax: Wax used as slip aid
[8]Thethanolamine: Amine synergist used for surface cure and reducing the effect of oxygen inhibition.

While formulating the above formulations, it was noted that Formulation B had a much higher level of trapped air than Formulation A.

Also, the cured coating made with Formulation B had extensive surface defects and low gloss, while the cured coating made with Formulation A had much better flow and leveling properties, a low level of trapped air, and much higher gloss. Flow and leveling properties were visually determined by observing the coatings for defects and unevenness.

Example 2

The epoxy composition set forth in TABLE 2 below was prepared by mixing the components together at a temperature of 25° C.

Then each of the following defoaming agents was added with stirring to a portion of the epoxy composition in a quantity of 0.5% by weight, based on the weight of the composition:

Defoaming Agent 1—a commercial silicone defoaming agent manufactured by Cognis Corporation of Ambler, Pa.

Defoaming Agent 2—the reaction product of epichlorohydrin and isodecyl alcohol•4EO (mole ratio 1.1:1).

Defoaming Agent 3—the reaction product of epichlorohydrin and a $C_{12}$•3PO•6EO alcohol.

Defoaming Agent 4—the reaction product of epichlorohydrin and isodecyl alcohol•4EO (mole ratio 1.1:1), which is further reacted with polydimethylsiloxane diglycidyl ether.

Defoaming Agent 5—the reaction product of epichlorohydrin and butoxytriglycol (mole ratio 1.1:1).

TABLE 2

| COMPONENT | Function | Source | Wt % |
| --- | --- | --- | --- |
| DER 324 | Epoxy resin | Dow Chemical Co., Midland, Mi. | 29.5 |
| DER 331 | Epoxy resin | Dow Chemical Co. | 29.5 |
| TIPore R-960 | Titanium dioxide pigment | Dupont Corporation, Wilmington, Del. | 14.8 |
| VERSAMINE ® C-31 | Epoxy curing agent-a cycloaliphatic amine | Cognis Corporation Ambler, PA | 26.2 |

The above compositions containing the respective additives were coated onto LENETA™ paper until a coating was formed. The results obtained are set forth in TABLE 3 below:

TABLE 3

| Additive Evaluated | Use Level, % | Entrained air, % | Coating Appearance 3 mll WFT Application on LENETA paper |
| --- | --- | --- | --- |
| Blank | — | 28.3 | Severe craters |
| Defoaming Agent 1 | 0.5 | 20.9 | Orange peel and some craters |
| Defoaming Agent 2 | 0.5 | 30.6 | No surface defects but loss of gloss |
| Defoaming Agent 3 | 0.5 | 22.4 | Few surface defects |
| Defoaming Agent 4 | 0.5 | 24.4 | No surface defects |
| Defoaming Agent 5 | 0.5 | 23.5 | Severe craters |

Key to coating appearance:
Few = 2–3 craters on 6" × 10" application of coating
Some = 4–10 craters on 6" × 10" application of coating
Severe = 10+ craters on 6" × 10" application of coating

What is claimed is:

1. In a nonaqueous composition, the improvement wherein the composition contains a defoaming effective quantity of at least one product of the reaction between A) a linking agent of formula I $$R^4(Y)_3 \qquad (I)$$

wherein each Y group is a halogen atom or one Y group is a halogen atom and two Y groups represent an epoxy oxygen atom, which is attached to two adjacent carbon atoms in the $R^4$ group to form an epoxy group, and $R^4$ is an alkanetriyl group containing from 3 to 10 carbon atoms; and B) a compound of formula II $$R^3(EO)_n(PO)_m(BO)_pX \qquad (II)$$

wherein $R^3$ is an organic oxy or thio group having from 1 to 36 carbon atoms or a primary or secondary amino group having from 1 to 36 carbon atoms; n is a number of from 0 to 50; m is a number of from 0 to 50; p is a number of from 0 to 50; and X is hydrogen, or X can be a mercapto group or an amino or a $C_1$–$C_6$ alkylamino group in place of a terminal —OH group, provided that when X is mercapto, amino or a $C_1$–$C_6$ alkylamino, the sum of n, m, and p must be at least 1; and the mole ratio of I:II is from about 0.1:1 to about 5:1.

2. The composition of claim 1, wherein the component A) linking agent is an epihalohydrin.

3. The composition of claim 2, wherein the epihalohydrin is epichlorohydrin.

4. The composition of claim 1, wherein said mole ratio is from about 0.4:1 to about 2:1.

5. The composition of claim 1, wherein said mole ratio is from about 0.6:1 to about 1.4:1.

6. The composition of claim 1, wherein in component B), the sum of n, m, and p is at least 1.

7. The composition of claim 1, wherein in component B), the sum of n, m, p is at least 2.

8. The composition of claim 1, wherein in component B) p is a number of from 1 to about 50.

9. The composition of claim 1, wherein in component B), $R^3$ is an alkyl group having from 4 to 12 carbon atoms.

10. The composition of claim 1 wherein in component B), the alkyl group contains from 8 to 10 carbon atoms.

11. The composition of claim 1 wherein in component B) n is a number from 2 to about 50.

12. The composition of claim 1, wherein in component B) $R^3$ is an alkyl group having from 4 to 12 carbon atoms and n is a number from about 2 to about 50.

13. The composition of claim 1, wherein in component B) $R^3$ is an alkyl group having from 8 to 10 carbon atoms and n is a number from about 4 to about 50.

14. The composition of claim 1 wherein in component B) X is hydrogen and p is a number of from 1 to about 50.

15. The composition of claim 1 wherein component B) is isodecyl alcohol•4EO.

16. The composition of claim 1 wherein said defoaming effective quantity is from about 0.1 to about 2% by weight based on the weight of the composition.

17. The composition of claim 1 wherein said defoaming effective quantity is from about 0.2 to about 0.5% by weight, based on the weight of the composition.

18. The composition of claim 1 wherein said composition is a coating-forming composition.

19. A method for forming a hard coating on a substrate comprising the steps of

I) applying the composition of claim 18 to at least one surface of the substrate; and II) curing said composition.

20. The method of claim 19 wherein step II) is carried out with ultraviolet or electron beam irradiation.

21. The method of claim 19 wherein the substrate is a hard substrate.

22. A nonaqueous composition curable by ultraviolet or electron beam irradiation comprising a) at least one UV/EB curable monomer and/or oligomer; and b) a defoaming effective quantity of at least one product of the reaction between
   i) a linking agent of formula I $$R^4(Y)_3 \quad (I)$$

wherein each Y group is a halogen atom or one Y group is a halogen atom and two Y groups represent an epoxy oxygen atom, which is attached to two adjacent carbon atoms in the $R^4$ group to form an epoxy group, and $R^4$ is an alkanetriyl group containing from 3 to 10 carbon atoms; and ii) a compound of formula II $$R^3(EO)_n(PO)_m(BO)_pX \quad (II)$$

wherein $R^3$ is an organic oxy or thio group having from 1 to 36 carbon atoms or a primary or secondary amino group having from 1 to 36 carbon atoms; n is a number of from 0 to 50: m is a number of from 0 to 50; p is a number of from 0 to 50; and X is hydrogen, or X can be a mercapto group or an amino or $C_1$–$C_6$ alkylamino group in place of a terminal —OH group, provided that when X is mercapto, amino or $C_1$–$C_6$ alkylamino, the sum of n, m, and p must be at least 1; and the mole ratio of i): ii) is from about 0.1:1 to about 5:1.

23. The composition of claim 22 wherein the component i) linking agent is an epihalohydrin.

24. The composition of claim 23, wherein the epihalohydrin is epichlorohydrin.

25. The composition of claim 22, wherein said mole ratio is from about 0.4:1 to about 2:1.

26. The composition of claim 22, wherein said mole ratio is from about 0.6:1 to about 1.4:1.

27. The composition of claim 22, wherein in component ii), the sum of n, m, and p is at least 1.

28. The composition of claim 22, wherein in component ii) the sum of n, m, and p is at least 2.

29. The composition of claim 22, wherein in component ii) p is a number of from 1 to about 50.

30. The composition of claim 22 in component ii) wherein $R^3$ is an alkyl group having from 4 to 12 carbon atoms.

31. The composition of claim 30, wherein the alkyl group contains from 8 to 10 carbon atoms.

32. The composition of claim 22, wherein in component ii) n is a number from 2 to about 50.

33. The composition of claim 22, wherein in component ii) is an alkyl group having from 4 to 12 carbon atoms and n is a number from about 2 to about 50.

34. The composition of claim 22, wherein in component ii) $R^3$ is an alkyl group having from 8 to 10 carbon atoms and n is a number from about 4 to about 50.

35. The composition of claim 22, wherein in component ii) X is hydrogen and p is a number of from 1 to about 50.

36. The composition of claim 22 wherein component ii) is isodecyl alcohol•4EO.

37. The nonaqueous composition of claim 18 wherein said composition contains at least one UV/EB curable monomer and/or oligomer.

38. The nonaqueous composition of claim 18 wherein said composition is a curable epoxy composition.

* * * * *